United States Patent
Lucas et al.

(10) Patent No.: US 10,294,045 B2
(45) Date of Patent: May 21, 2019

(54) BUCKET CONVEYOR SYSTEM ON STORAGE/DELIVERY SYSTEM

(71) Applicant: Halliburton Energy Services, Inc., Houston, TX (US)

(72) Inventors: Bryan Chapman Lucas, Duncan, OK (US); Tim H. Hunter, Duncan, OK (US); Calvin L. Stegemoeller, Duncan, OK (US); Bryan John Lewis, Duncan, OK (US); Austin Carl Schaffner, Duncan, OK (US); Jim Basuki Surjaatmadja, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/563,673

(22) PCT Filed: May 7, 2015

(86) PCT No.: PCT/US2015/029686
§ 371 (c)(1),
(2) Date: Oct. 2, 2017

(87) PCT Pub. No.: WO2016/178691
PCT Pub. Date: Nov. 10, 2016

(65) Prior Publication Data
US 2018/0134507 A1 May 17, 2018

(51) Int. Cl.
*B65G 65/42* (2006.01)
*B65D 88/30* (2006.01)
(52) U.S. Cl.
CPC ............. *B65G 65/42* (2013.01); *B65D 88/30* (2013.01)
(58) Field of Classification Search
CPC ...... B65G 65/42; B65D 88/30; B28C 7/0076; B28C 7/0481

(Continued)

(56) References Cited

U.S. PATENT DOCUMENTS 2,310,592 A * 2/1943 Noble .................. B28C 7/0486
198/360
2,838,805 A * 6/1958 Shepherd .............. B65D 88/30
182/194

(Continued)

FOREIGN PATENT DOCUMENTS

CN 2552882 Y 5/2003
JP 06-053525 B2 7/1994

OTHER PUBLICATIONS

International Search Report and Written Opinion issued in related PCT Application No. PCT/US2015/029686 dated Jan. 27, 2016, 12 pages.

(Continued)

*Primary Examiner* — Kaitlin S Joerger
(74) *Attorney, Agent, or Firm* — John W. Wustenberg; Baker Botts L.L.P.

(57) ABSTRACT

In accordance with embodiments of the present disclosure, systems and methods for using containers of bulk material along with a bucket conveyor system, instead of a pneumatic transfer process, to move the bulk material from a transportation unit to a storage/delivery system are provided. A transportation unit may deliver one or more containers full of bulk material toward a fill hopper of the bucket conveyor system. The containers may be positioned proximate the fill hopper to release the bulk material directly into the fill hopper. The bucket conveyor may deliver the bulk material from the fill hopper into the storage/delivery system. Since the containers are maneuverable into a position to output bulk material directly into the fill hopper and without pneumatic transfer, the bucket conveyor system may enable a cleaner and more efficient bulk material transfer at the site.

18 Claims, 5 Drawing Sheets

(58) Field of Classification Search
USPC .......................................................... 366/41
See application file for complete search history.

(56) References Cited

U.S. PATENT DOCUMENTS

| | | | | |
|---|---|---|---|---|
| 6,835,041 | B1* | 12/2004 | Albert | ...................... B61D 9/02 |
| | | | | 105/241.2 |
| D688,349 | S | 8/2013 | Oren et al. | |
| D688,350 | S | 8/2013 | Oren et al. | |
| D688,351 | S | 8/2013 | Oren et al. | |
| D688,772 | S | 8/2013 | Oren et al. | |
| 8,827,118 | B2 | 9/2014 | Oren | |
| 9,878,651 | B2* | 1/2018 | Herman | ..................... B60P 1/04 |
| 2009/0135665 | A1* | 5/2009 | Contamin | ............. B28C 7/0076 |
| | | | | 366/41 |
| 2012/0321421 | A1 | 12/2012 | Lavoie | |
| 2014/0083554 | A1 | 3/2014 | Harris | |
| 2014/0299225 | A1 | 10/2014 | Oren | |
| 2015/0003955 | A1 | 1/2015 | Oren et al. | |
| 2015/0044004 | A1 | 2/2015 | Pham et al. | |
| 2018/0194259 | A1* | 7/2018 | Herman | ..................... B60P 1/04 |

OTHER PUBLICATIONS

International Preliminary Report on Patentability issued in related PCT Application No. PCT/US2015/029686, dated Nov. 16, 2017, 9 pages.

* cited by examiner

BUCKET CONVEYOR SYSTEM ON STORAGE/DELIVERY SYSTEM

CROSS-REFERENCE TO RELATED APPLICATION

The present application is a U.S. National Stage Application of International Application No. PCT/US2015/029686 filed May 7, 2015, which is incorporated herein by reference in its entirety for all purposes.

TECHNICAL FIELD

The present disclosure relates generally to transferring solid or liquid bulk materials for well operations, and more particularly, to a bucket conveyor system for transporting bulk materials into a storage/delivery system.

BACKGROUND

During the drilling and completion of oil and gas wells, various wellbore treating fluids are used for a number of purposes. For example, high viscosity gels are used to create fractures in oil and gas bearing formations to increase production. High viscosity and high density gels are also used to maintain positive hydrostatic pressure in the well while limiting flow of well fluids into earth formations during installation of completion equipment. High viscosity fluids are used to flow sand into wells during gravel packing operations. The high viscosity fluids are normally produced by mixing dry powder and/or granular materials and agents with water at the well site as they are needed for the particular treatment. Systems for metering and mixing the various materials are normally portable, e.g., skid- or truck-mounted, since they are needed for only short periods of time at a well site.

The powder or granular treating material is normally transported to a well site in a commercial or common carrier tank truck. Once the tank truck and mixing system are at the well site, the dry powder material (bulk material) must be transferred or conveyed from the tank truck into a supply tank for metering into a blender as needed. The bulk material is usually transferred from the tank truck pneumatically. More specifically, the bulk material is blown pneumatically from the tank truck into an on-location storage/delivery system (e.g., silo). The storage/delivery system may then deliver the bulk material onto a conveyor or into a hopper, which meters the bulk material through a chute into a blender tub.

The pneumatic conveying process used to deliver bulk material from the tank truck can be a time-consuming process. In addition, some well locations are arranged without a large amount of space to accommodate tank trucks, such that only a limited number of available tank trucks can be positioned to pneumatically fill the storage/delivery system at a given time. Accordingly, the pneumatic conveying process can lead to dead time of equipment usage and relatively high detention costs or demurrage costs associated with the tank trucks, hoses, and related equipment that are on-location during this time.

Furthermore, during the pneumatic conveying process, the bulk material is moved from the tank truck to the storage/delivery system in a turbulent manner, leading to large amounts of dust and noise generation. The air used for conveying the material must be vented from the storage tank and typically carries an undesirable amount of dust with it. Attempts to control dust during the conveying process typically involve the rig up and use of auxiliary equipment, such as a dust collector and duct work, adding cost to the material handling operations.

In addition, traditional material handling systems can have several transfer points between the outlets of multiple storage/delivery systems and a blender. These transfer points often have to be shrouded and ventilated to prevent an undesirable release of dust into the environment. Further, after the dust has been captured using the dust collectors and ventilation systems, additional steps are needed to dispose of the dust.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
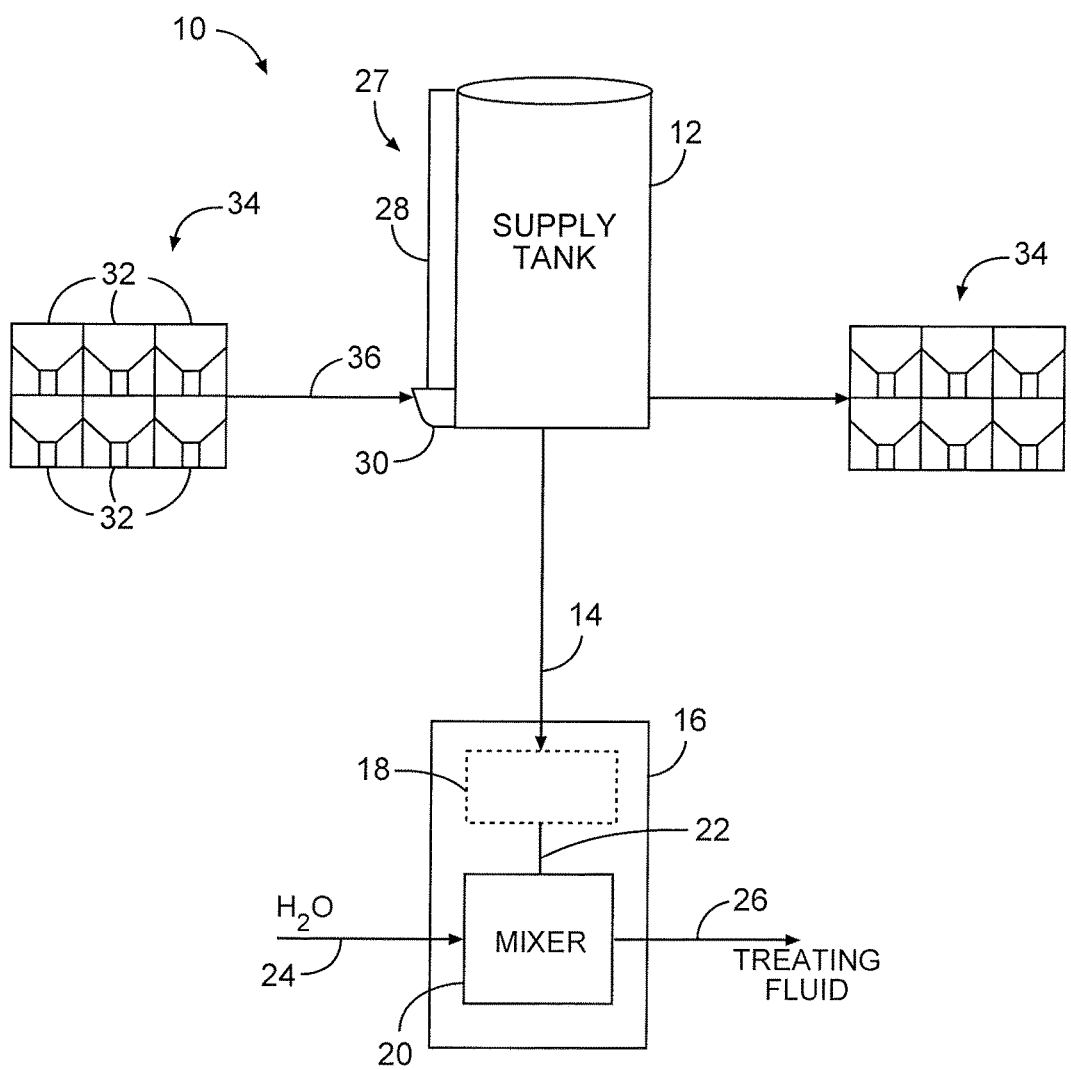
FIG. 1 is a schematic block diagram of a bulk material handling system suitable for mixing bulk additive materials with liquids to form well treating fluids at a well site, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to systems and methods for managing bulk material (e.g., bulk solid or liquid material used on location) efficiently at a well site. More specifically, the disclosed embodiments are directed to systems and methods for efficiently filling an on-location storage/delivery system, such as a silo, with bulk material. The present disclosure may include a storage/delivery system that utilizes one or more containers (e.g., pre-filled containers or filled on location) holding bulk material and a bucket conveyor system to move the bulk material from a transportation unit to a storage compartment within the storage/delivery system. The disclosed techniques may be used to efficiently handle any desirable bulk material having a solid or liquid constituency including, but not limited to, sand, proppant, gel particulate, dry-gel particulate, liquid additives, and others.

In currently existing on-site bulk material handling applications, bulk material (e.g., sand, proppant, gel particulate, or dry-gel particulate) may be used during the formation of treatment fluids. In such applications, the bulk material is transferred between transportation units, storage tanks, blenders, and other on-site components. The bulk material is often transferred pneumatically using pressurized air flows to provide the bulk material, for example, from a transportation unit (e.g., tank truck) to a storage/delivery system (e.g., silo). The bulk material may later be moved from the storage/delivery system to a hopper on a blender truck. A sand screw, chute, or other metering mechanism disposed in the hopper then meters the bulk material into a mixing tub of the blender, where the bulk material is mixed with other materials (e.g., water, fluids, chemicals, etc.). In some instances, the bulk material can be transferred pneumatically from a transportation unit into a storage tank on the blender truck.

Pneumatic transfer methods are generally selected due to the simplicity of the process. However, certain inherent inefficiencies are associated with the above-described pneumatic transfer of bulk material at a well site. First, blowing the bulk material pneumatically from a transportation unit to a storage/delivery system is a time consuming process, taking at least an hour to empty a single truck. Although the pneumatic process of blowing bulk material into a storage container can be accomplished prior to using the bulk material in blender operations, the long amount of time spent pneumatically transferring the bulk material to the storage/delivery system can lead to high equipment/detention costs. Detention costs are associated with the transportation equipment (e.g., tank trucks) being positioned on location for a period of time. In some instances, the equipment on location may be arranged so that accessibility to storage/delivery systems is limited for transportation units being used to pneumatically fill the storage/delivery systems. As a result, a large amount of time can be wasted by trucks waiting to move into position as other trucks are unloading bulk material, or trucks waiting for the material already in a storage bin to be used to make room for the next load of material.

In addition, the pneumatic transfer of bulk material tends to require a large amount of air to move the material through the system. As this volume of air vents to the atmosphere, fine dust particles and entrained and released. It is undesirable for this dust to be released into the atmosphere. Accordingly, existing systems employ dust control techniques that often utilize large pieces of additional equipment, separate power supplies, and complicated setups. In addition, the pneumatic transfer process, as well as the systems used to control dust, can lead to an undesirable level of noise produced during bulk material transfer.

The bucket conveying systems disclosed herein are designed to address and eliminate these shortcomings. The presently disclosed techniques use containers of bulk material along with a bucket conveyor system, instead of a pneumatic transfer process, to move the bulk material from a transportation unit to a storage/delivery system. A transportation unit may deliver one or more containers full of bulk material toward a fill hopper of the bucket conveyor system. The containers may be positioned proximate the fill hopper to release the bulk material directly into the fill hopper. The bucket conveyor may deliver the bulk material from the fill hopper into the storage/delivery system. Since the containers are maneuverable into a position to output bulk material directly into the fill hopper and without pneumatic transfer, the bucket conveyor system may enable a cleaner and more efficient bulk material transfer at the site.

The bucket conveyor systems and methods described herein may reduce detention costs associated with bulk material handling at the location, since the efficient filling process may enable a quicker offloading of each tank truck, as compared to those that rely on pneumatic transfer. The disclosed bucket conveyor system may also facilitate a lower footprint of the storage/delivery system provided at the location, thereby decreasing equipment costs. This is because less storage capacity may be needed at the location when the storage/delivery system is able to be filled relatively quickly via the bucket conveyor system, as compared to a pneumatic filling process. In addition, by eliminating the pneumatic conveyance process entirely, the bucket conveyor system may reduce the amount of dust generated at the location, as well as the noise levels associated with the bulk material transfer. The reduced dust generation may allow a reduction in the size of various dust control equipment used to ventilate the material handling system, leading to a reduction in overall cost, footprint, and rig-up time of the dust control equipment.

Turning now to the drawings, FIG. 1 is a block diagram of a bulk material handling system 10. The system 10 includes a storage/delivery system (also known as a supply tank or a silo 12), for holding a quantity of bulk material (e.g., solid or liquid treating material). The silo 12 may utilize a gravity feed to provide a controlled, i.e. metered, flow of bulk material at an outlet 14. The outlet 14 may be a chute that conveys the bulk material from the silo 12 to a blender 16. As illustrated, the blender 16 may include a hopper 18 and a mixer 20 (e.g., mixing compartment). The blender 16 may also include a metering mechanism 22 for providing a controlled, i.e. metered, flow of bulk material from the hopper 18 to the mixer 20. However, in other embodiments the blender 16 may not include the hopper 18, such that the outlet 14 from the silo 12 may provide bulk material directly into the mixer 20.

Water and other additives may be supplied to the mixer 20 (e.g., mixing compartment) through an inlet 24. The bulk material and water may be mixed in the mixer 20 to produce (at an outlet) a fracing fluid, gel, cement slurry, drilling mud, or any other fluid mixture for use on location. The outlet 26 may be coupled to a pump for conveying the treating fluid into a well (e.g., a hydrocarbon recovery well) for a treating process. It should be noted that the disclosed silo 12 may be utilized to provide bulk material for use in a variety of treating processes. For example, the disclosed systems and methods may be utilized to provide proppant materials into fracture treatments performed on a hydrocarbon recovery well. In other embodiments, the disclosed techniques may be used to provide other materials (e.g., non-proppant) for diversions, conductor-frac applications, cement mixing, drilling mud mixing, and other fluid mixing applications.

The silo 12 may include a bucket conveyor system 27 including a bucket elevator or bucket lift 28 and a fill hopper 30. The bucket lift 28 may be designed to transfer bulk material from the fill hopper 30 into the silo 12. Bulk material may be provided to and released into the fill hopper 30 from one or more bulk material containers 32. The containers 32 may be replaceable such that once the bulk material from one container 32 is emptied into the fill hopper 30, a new container 32 may be positioned proximate the fill hopper 30 to maintain a steady flow of bulk material through the bucket conveyor system 27 and into the silo 12. The silo 12 may be utilized to hold a large amount of bulk material and to output a steady flow of bulk material to the blender 16 for forming the treating fluid.

Each container 32 may hold the same type, particle size, and/or material of bulk material in some embodiments. In other embodiments, the containers 32 used to fill the silo 12 may hold different types, particle sizes, and/or materials of bulk material, to provide a desired treating fluid for the treating process being performed. For example, when performing fracturing operations, it may be desirable to initially pump a treating fluid having smaller proppant particles downhole, to start opening perforations formed within the well. After this, the fracturing treatment may proceed to pumping a treating fluid with large proppant particles downhole, to expand the openings in the perforations. The large proppant particles may be supplied from one container 32 after the smaller proppant particles are used from another container 32.

A portable bulk storage system 34 may be provided at the well site for storing one or more additional containers 32 of bulk material to be emptied into the silo 12. The bulk material containers 32 may be transported to the well site on a transportation unit (e.g., truck). The bulk storage system 34 may be the transportation unit itself or may be a skid, a pallet, or some other holding area. Before a treatment begins, one or more containers 32 of bulk material may be transferred from the storage system 34 to the fill hopper 30 proximate the silo 12, as indicated by the arrow 36. This transfer may be performed by transporting the container 32 along a conveyor or by lifting the container 32 via a hoisting mechanism, such as a forklift or a crane.

After one or more containers 32 are emptied into the fill hopper 30 for the bucket lift 28 to transport the bulk material into the silo 12, the empty container(s) 32 may be removed via a conveyor or a hoisting mechanism. In some embodiments, the one or more empty containers 32 may be positioned on another bulk storage system 34 (e.g., a transportation unit, a skid, a pallet, or some other holding area) until they can be removed from the well site and/or refilled. In other embodiments, the one or more empty containers 32 may be positioned directly onto a transportation unit for transporting the empty containers 32 away from the well site. It should be noted that the same transportation unit used to provide one or more filled containers 32 to the well site may then be utilized to remove one or more empty containers from the well site.

Figure 2:
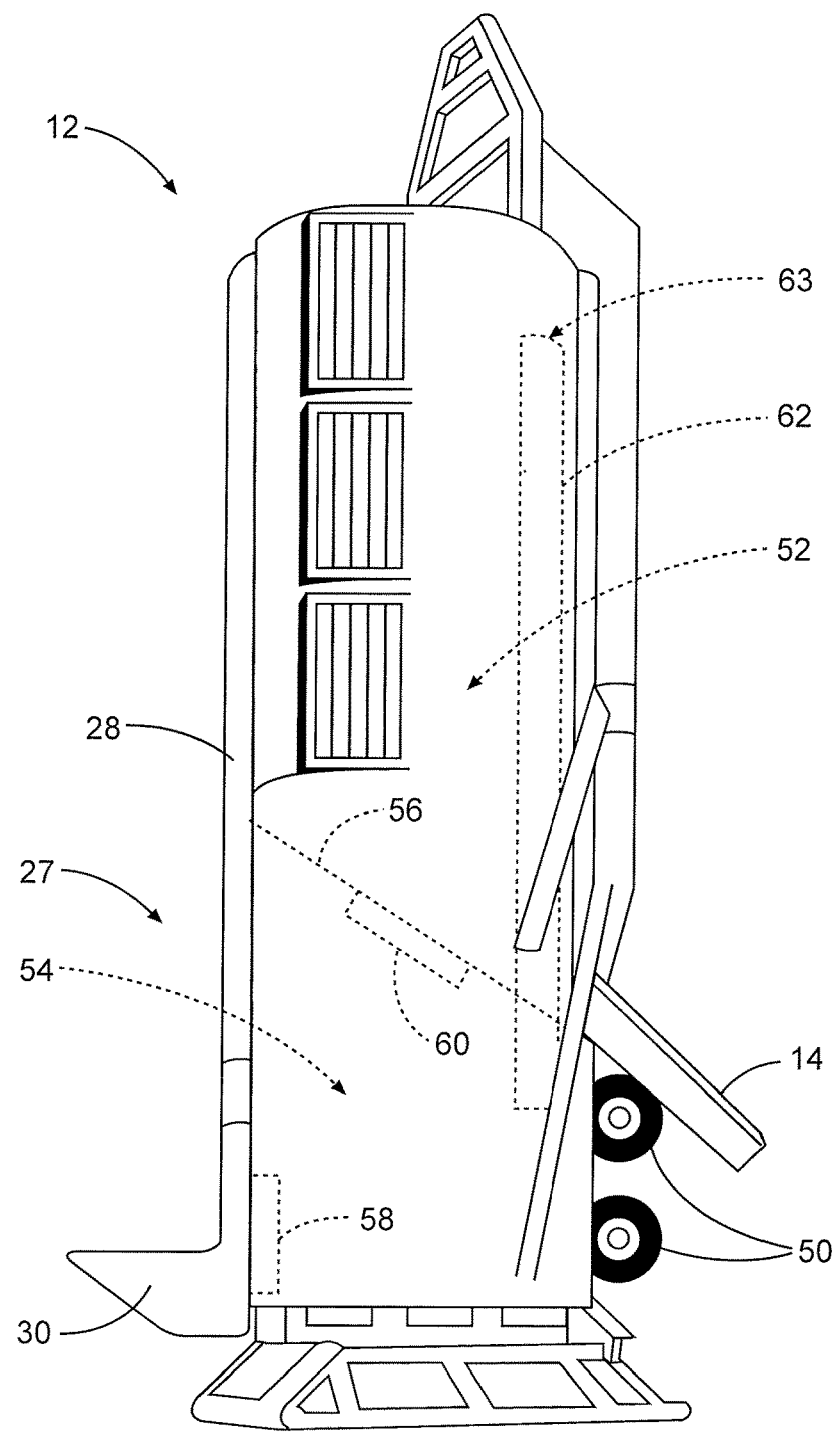
FIG. 2 is a schematic view of a storage/delivery system with a bucket conveyor system for filling an internal compartment of the storage/delivery system, in accordance with an embodiment of the present disclosure.

FIG. 2 provides a more detailed view of an embodiment of the silo 12, including the fill hopper 30, bucket lift 28, and outlet chute 14. In the illustrated embodiment, the silo 12 may be a mobile delivery system (e.g., with wheels 50 for transporting the silo 12 to/from the well site). The silo 12 may include a gravity fill chute 14 that functions to continuously discharge bulk material directly into a blender receptacle (not shown).

The term "blender receptacle" used herein may refer to any number of tubs, hoppers, mixers, and other areas where bulk material is needed. As mentioned above, the blender receptacle may be associated with a blender disposed at the well site. For example, the blender receptacle may be a blender hopper (e.g., hopper 18 of FIG. 1) used to provide bulk material to a metering system that meters the bulk material into a mixer. In other embodiments, the blender receptacle may be a mixer (e.g., mixer 20 of FIG. 1) of a blender. In still other embodiments, the blender receptacle may be a mixer feeder (e.g., conveyor, sand screw, or the metering mechanism 22 of FIG. 1). Other embodiments of the system 10 may utilize other types of blender receptacles for receiving the bulk material from the disclosed silo 12.

As mentioned above, the silo 12 may also include the bucket conveyor system 27 having a bucket lift 28 used in combination with a fill hopper 30 to delivery bulk material into an internal storage volume of the silo 12. The bucket lift 28 is generally a lift that uses multiple scoop-shaped components disposed along the lift to capture and transport the bulk material upward. As each scoop-shaped component (i.e., bucket) passes through the fill hopper 30, the buckets may scoop a certain amount of bulk material out of the fill hopper 30, and the lift carries the filled buckets up toward the top of the silo 12. From here, the buckets may be rotated downward to release the bulk material from the buckets into an internal storage volume of the silo 12. In the illustrated embodiment, the buckets used to transport bulk material within the bucket lift 28 may be housed in an enclosure (e.g., tubular enclosure) to reduce or eliminate an amount of dust released from the bucket lift 28 into the atmosphere.

In some embodiments, the bucket lift 28 and fill hopper 30 may be built into or integral with the silo 12. In other embodiments, the bucket lift 28 may be a separate component from the silo 12. Independent bucket lifts 28 (i.e., those that are made separately and later attached to the silo 12) may be manufactured for use with a particular storage silo 12. The bucket lift 28 may be an inclined or angled lift in some embodiments.

As described in detail below with respect to FIGS. 3-6, the fill hopper 30 may be filled in many different ways. Indeed, the disclosed fill hopper 30 may be filled using any currently existing (or later developed) filling methods. This may enable bulk material delivery companies to deliver the bulk material directly into the fill hopper 30 using any desired method. Once bulk material is loaded into the fill hopper 30, the bucket lift 28 may deliver the bulk material towards the top of the silo 12, filling the internal storage volume within the silo 12.

Although the illustrated fill hopper 30 is disposed toward the bottom of the silo 12, in other embodiments the fill hopper 30 may be positioned at a higher (i.e., elevated) location along the silo 12. In such instances, an angular delivery system (e.g., inclined lift) may be utilized to deliver a container of bulk material to a position above the fill hopper 30.

In some embodiments, the silo 12 may have two internal sections for bulk material storage. For example, the silo 12 may include a first internal storage volume (i.e., primary storage compartment 52) and a second internal storage volume (i.e., secondary storage compartment 54). The primary storage compartment 52 may be used to feed the gravity discharge chute 14. As illustrated, a partition 56 (e.g., the "floor" or bottom edge of the upper compartment 52) between the two compartments 52 and 54 may be sloped at approximately the same incline as the chute 14, to direct bulk material from the primary compartment 52 into the chute 14 in response to gravity. The secondary storage compartment 54 may provide additional capacity by selectively filling the fill hopper 30 on demand. The bucket lift 28 may then refill the primary storage compartment 52 using bulk material that was previously stored in the secondary compartment 54. Thus, the primary storage compartment 52 may represent a refillable capacity of the silo 12, while the secondary storage compartment 54 may represent an extra capacity of the silo 12.

To selectively fill the fill hopper 30 with bulk material from the secondary compartment 54, the silo 12 may include a gate 58 positioned along a wall of the silo 12 between the secondary compartment 54 and the fill hopper 30. The gate 58 may be controlled to selectively open the secondary compartment 54 to the fill hopper 30, thereby allowing bulk material from the secondary compartment 54 to flow into the fill hopper 30.

Bulk material may be routed to the secondary compartment 54 in a number of different ways. In some embodiments, a portion of the bulk material delivered to the primary (upper) compartment 52 may be channeled to the secondary (lower) compartment 54. For example, a gate 60 may be disposed along the partition 56 between the primary and secondary compartments 52 and 54. The gate 60 may be selectively opened/closed to provide a desired amount of extra bulk material from the primary storage compartment 52 into the secondary storage compartment 54.

In addition to, or in lieu of, the gate 60, the silo 12 may include an overflow port 62 connecting the upper and lower compartments 52 and 54. As shown, the overflow port 62 may include a pipe extending toward the top of the silo 12. When the overflow port 62 is opened, bulk material may flow from the top of the upper compartment 52 into the lower compartment 54 upon the height of the bulk material reaching a certain level 63. In some embodiments, the overflow port 62 may be selectively opened/closed to provide a desired amount of extra bulk material from the primary storage compartment 52 into the secondary storage compartment 54. In other embodiments, the overflow port 62 may be held open so that any amount of bulk material reaching above the level 63 may be automatically routed into the secondary compartment 54.

Figure 3:
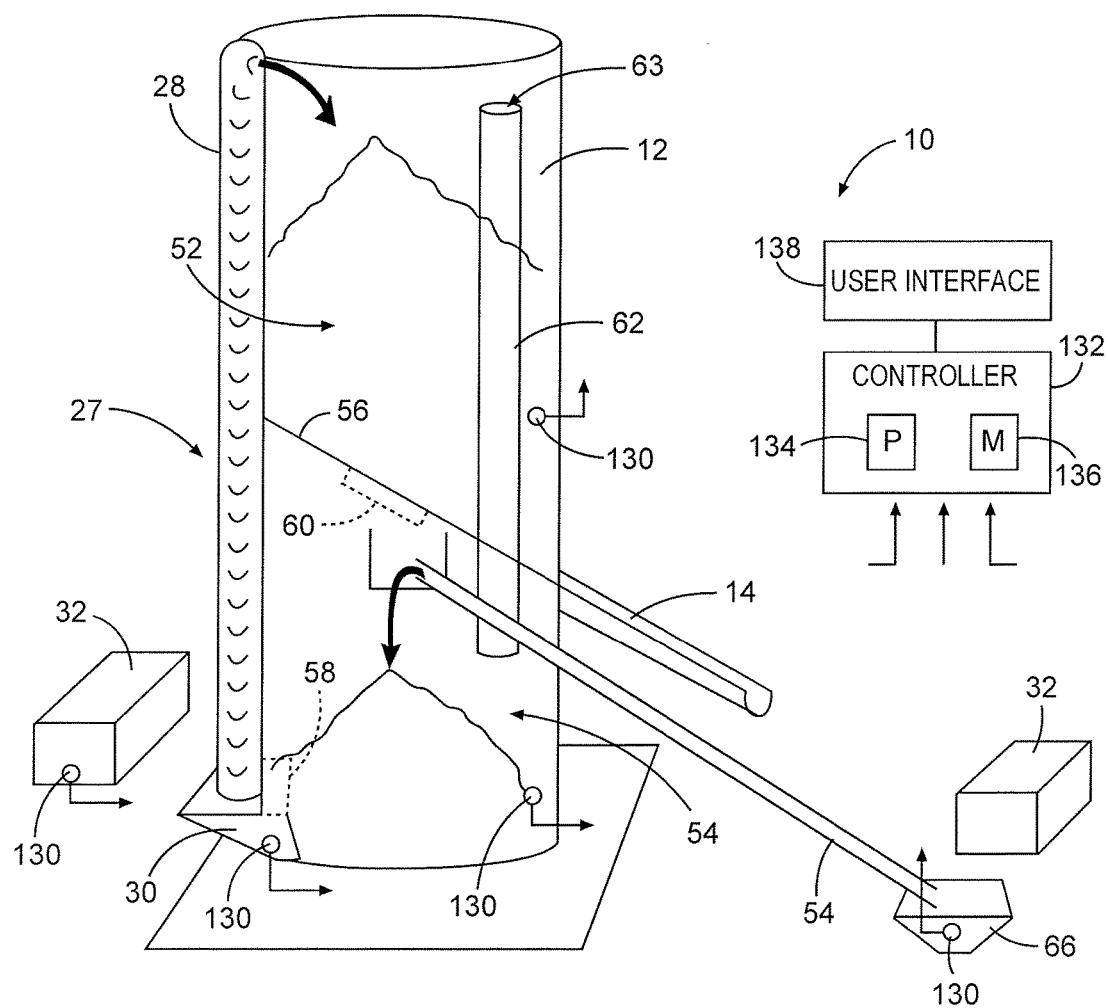
FIG. 3 is a schematic view of a storage/delivery system with a bucket conveyor system that provides bulk material from two different feeds into an internal compartment of the storage/delivery system, in accordance with an embodiment of the present disclosure.

In other embodiments, the secondary compartment 54 may be filled independently from the primary storage compartment 52 via a separate filling mechanism. FIG. 3 illustrates an embodiment of the material handling system 10 that operates by filling both compartments 52 and 54 of the silo 12 separately. As illustrated in FIG. 3, the system 10 may include an inclined lift 64 (i.e., angular delivery system) integrated with the silo 12 and designed to fill the secondary storage compartment 54 of the silo 12. The inclined lift 64 may also include a fill hopper 66 at one end, and bulk material may be released from containers 32 into the fill hopper 66 of the inclined lift 64, similar to the fill hopper 30 of the bucket lift 28. In other embodiments, different methods may be used to provide bulk material to the inclined lift 64 for filling the secondary compartment 54. As illustrated in FIG. 3, the silo 12 may utilize any of these available filling techniques (i.e., inclined lift 64, gate 60 between the compartments, and overflow port 62), or a combination thereof, to route bulk material to the secondary compartment 54.

The bulk material stored in the secondary compartment 54 may be used to supplement the bulk material provided from the containers 32 directly to the fill hopper 30. In some embodiments, moving an empty container 32 out of the way of the fill hopper 30 and providing a new container of bulk material to the fill hopper 30 may take a certain amount of time. However, it may be desirable to continuously operate the bucket lift 28 to provide more bulk material into the primary storage compartment 52 of the silo 12, especially as bulk material is being output from the silo 12 via the chute 14. To that end, the bulk material stored in the secondary compartment 54 may be moved into the fill hopper 30 (through the open gate 58) to maintain a desired level of bulk material in the fill hopper 30 of the bucket conveyor system 27. In some embodiments, the gate 58 may be opened/closed as needed in response to sensor signals indicative of the level of material in the fill hopper 30. In other embodiments, the gate 58 may be disposed toward the bottom of the fill hopper 30 such that, even while the gate 58 remains continuously open, bulk material does not feed into the fill hopper 30 from the secondary compartment 54 until after the bulk material in the fill hopper 30 reaches a certain fill level. Thus, the containers 32 are used as a primary feed of bulk material into the fill hopper 30, and the secondary compartment 54 is used as a secondary feed of bulk material into the fill hopper 30.

As mentioned above with respect to FIG. 1, the silo 12 may utilize bulk material that is transported into the fill hopper 30 in any desirable manner. In present embodiments, this delivery of bulk material to the fill hopper 30 of the silo 12 may be accomplished using filled containers 32 that are filled with bulk material at a bulk material site or at the well site. The containers 32 may be carried via forklifts, conveyors, or other delivery components to a position proximate the fill hopper 30, where the contents of the containers 32 may be dumped directly into the fill hopper 30. The bucket lift 28 may then deliver the bulk material from the fill hopper 30 into the primary compartment 52 of the silo 12.

Figure 4:
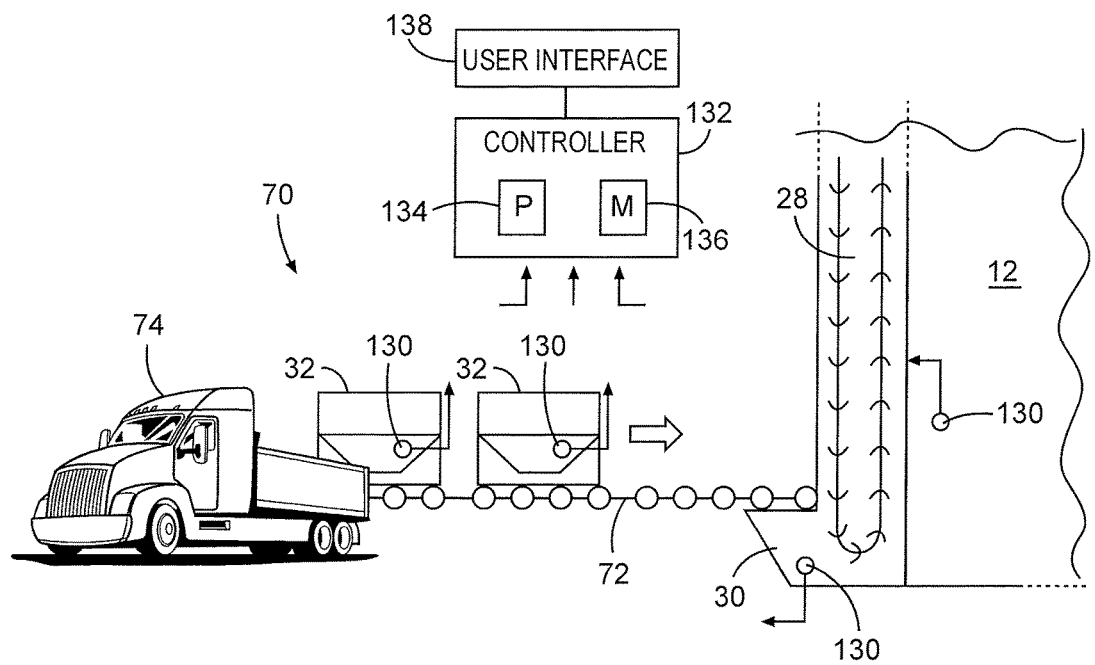
FIG. 4 is a schematic view of a bulk material container delivery system for providing bulk material into a fill hopper of the bucket conveyor system of FIGS. 2 and 3, in accordance with an embodiment of the present disclosure.

FIG. 4 illustrates one method that may be utilized to deliver one or more containers 32 of bulk material to the fill hopper 30 prior to releasing the bulk material from the containers 32 directly into the fill hopper 30. As shown, a mobile delivery system 70 may be utilized to move the one or more containers 32 to a position proximate the fill hopper 30. Specifically, the mobile delivery system 70 may include a conveyor 72 for moving the containers 32 from a transportation unit 74 (e.g., truck) to the fill hopper 30.

It should be noted that the illustrated conveyor 72 may be designed to move the containers 32 of bulk material from the transportation unit 74 to a position over the fill hopper 30 prior to the containers 32 releasing their bulk material contents directly into the fill hopper 30. In some embodiments, the conveyor 72 may include a set of rails or rollers with an opening in the middle. The containers 32 may be able to ride from the transportation unit 74 to the fill hopper 30 along the rails/rollers and release bulk material through the openings between the rails/rollers and into the fill hopper 30.

As illustrated, a portion of the conveyor 72 may be disposed proximate to or touching a portion of the transportation unit 74, while another portion of the conveyor 72 may be disposed directly above the fill hopper 30. With the conveyor 72 positioned in this manner, the mobile delivery system 70 may deliver the containers 32 from the transportation unit 74 to the fill hopper 30 without the use of a hoisting mechanism (e.g., crane, forklift, or any other lift). The containers 32 may be moved onto the conveyor 72 at the level of the transportation unit 74, and the conveyor 72 may move the containers 32 to a position directly above the fill hopper 30. This may enable relatively quick loading and unloading of the containers 32 relative to the transportation unit 74. In addition, this type of mobile delivery system 70 may eliminate the need to perform elevated work for filling the fill hopper 30.

In some embodiments, the conveyor 72 may complete a circuit from the transportation unit 74 to the fill hopper 30 and back to the transportation unit 74. This may enable containers 32 filled with bulk material to be unloaded from the transportation unit 74, moved to a position proximate the fill hopper 30, emptied into the fill hopper 30, and returned as an empty container 32 to the transportation unit 74 for removal from the well site. In other embodiments, the conveyor 72 may extend from one transportation unit 74 to the fill hopper 30, then to another transportation unit 74 positioned to receive and remove the empty containers 32 from the mobile delivery system 70. Any desirable number of conveyors 72 may be utilized to supply one or more containers from the transportation unit 74 to a position above the fill hopper 30 and from the position above the fill hopper 30 to the same or a different transportation unit 74 for removing the empty container from the well site.

Figure 5:
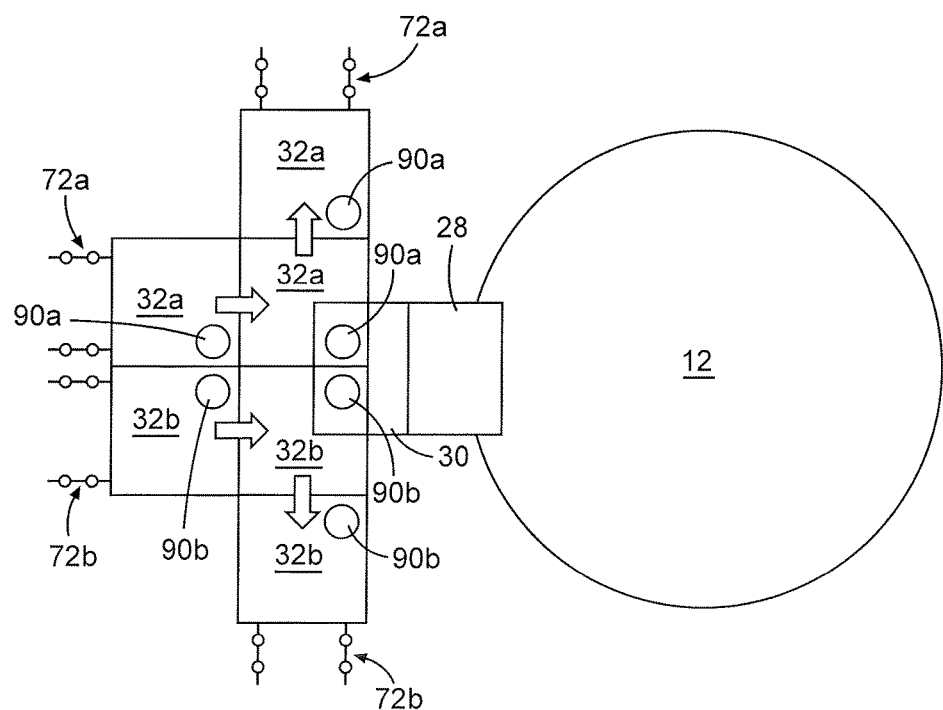
FIG. 5 is a schematic view of a bulk material container delivery system for providing bulk material into a fill hopper of the bucket conveyor system of FIGS. 2 and 3, in accordance with an embodiment of the present disclosure.

Still other arrangements of conveyors 72 may be utilized in other embodiments. For example, multiple conveyors 72 may be used to position containers 32 holding different types of bulk material over the fill hopper 30 at the same time. FIG. 5 illustrates one embodiment of this type of mobile delivery system 70, taken as an above view. In this embodiment, each of the containers 32 may be designed with a conical bottom that funnels toward an opening 90 in the bottom of the container 32. This opening 90 may be disposed in a corner of the container 32. This allows more than one container 32 to be positioned proximate the fill hopper 30 such that the openings 90 in the containers 32 are both disposed directly over the fill hopper 30 at the same time.

In some embodiments, the two different containers (e.g., 32a and 32b) may hold the same type, particle size, and/or material of bulk material. In other embodiments, the two containers 32a and 32b may hold different types, particle sizes, and/or materials of bulk material. The containers 32a and 32b may be selectively actuated to dump their contents into the fill hopper 30 as needed. For example, when the bulk material of container 32a is desired, this container 32a may be opened to release the bulk material directly into the hopper 30 through the opening 90a. When the bulk material of container 32b is desired, this container 32b may be opened to release the bulk material directly into the hopper 30 through the opening 90b. Once one of the containers 32 above the fill hopper 30 is emptied, the container 32 may be easily pushed out of the way and replaced by another container 32.

As illustrated, a first set of containers 32a may be transported to/from the fill hopper 30 along a first conveyor 72a (e.g., first set of tracks), while a second set of containers 32b may be transported to/from the fill hopper 30 along a second conveyor 72b (e.g., second set of tracks). Both conveyors 72a and 72b may be positioned side by side to move the respective containers 32a and 32b from one or more transportation units to a position above the fill hopper 30. The conveyors 72a and 72b may then move the containers 32a and 32b in opposite directions from each other, away from the fill hopper 30, once they are emptied. Thus, the containers 32 may be quickly pushed out of the way on these diverging conveyor tracks once emptied.

The illustrated arrangement of conveyors 72 used to provide two different containers 32 to the fill hopper 30 at the same time may enable switching between two containers supplying the fill hopper 30 with bulk material, which may then be carried via the bucket lift 28 into the silo 12. In some embodiments, the mobile delivery system 70 may be automated to switch between releasing bulk material from one container 32a to the other container 32b as desired. By providing this automated switching, the system may allow the containers 32 to constantly provide bulk material into the fill hopper 30. For example, when one container 32a has emptied all of its bulk material into the fill hopper 30, the other container 32b may be opened to the fill hopper 30 to provide additional bulk material for the bucket lift 28. As the container 32b is releasing bulk material into the fill hopper 30, the emptied container 32a may be moved out of the way along the conveyor track 72a and replaced by another container 32a full of bulk material positioned over the fill hopper 30. When the container 32b is emptied, this process may be repeated.

Figure 6:
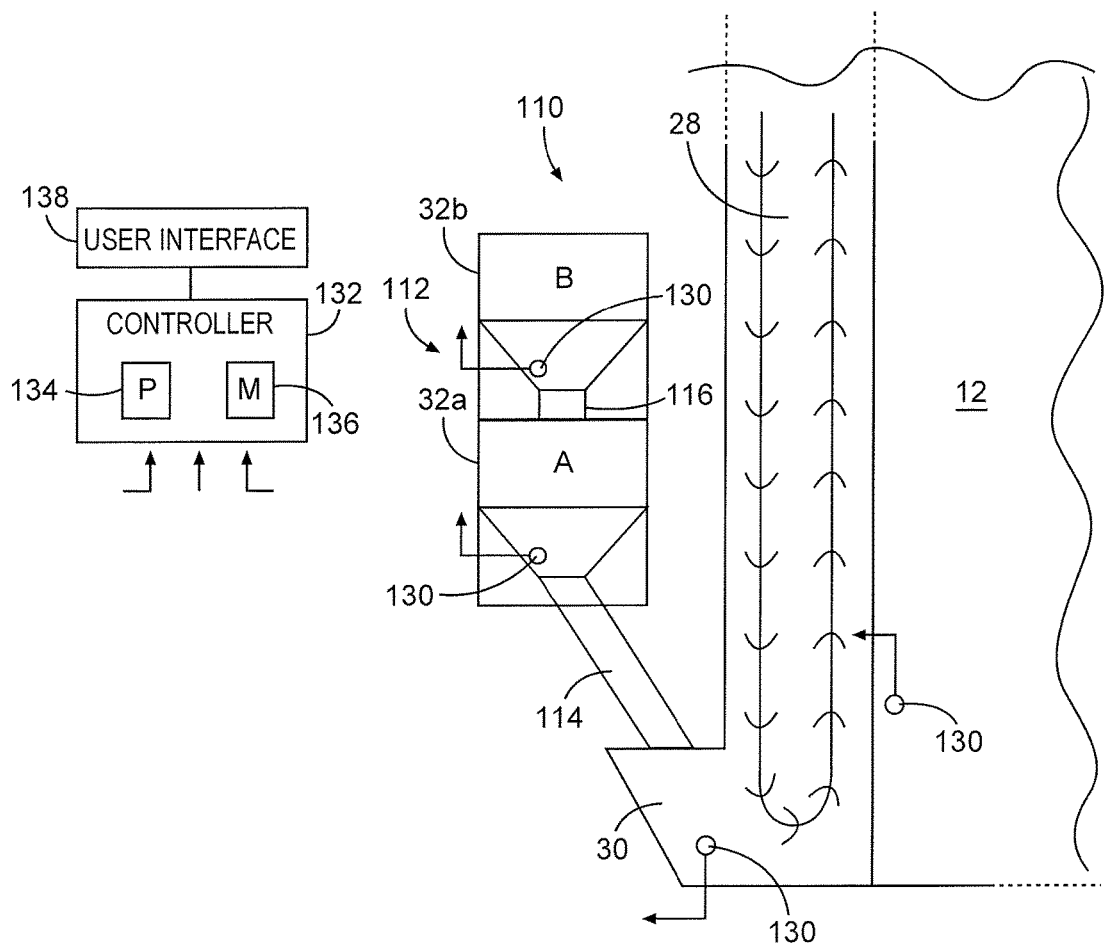
FIG. 6 is a schematic view of stacked bulk material containers for providing bulk material into a fill hopper of the bucket conveyor system of FIGS. 2 and 3, in accordance with an embodiment of the present disclosure.

FIG. 6 illustrates another embodiment of a delivery system 110 for providing bulk material from one or more containers 32 directly into the fill hopper 30 supplying the bucket lift 28 on the silo 12. In this embodiment, one or more containers 32 may be disposed at an elevated position proximate the fill hopper 30. In the illustrated embodiment, two containers 32a and 32b are arranged to form a container stack 112 positioned around the fill hopper 30, with a chute 114 extending from the lower container 32a of the container stack 112 directly into the fill hopper 30. This chute 114 may provide a gravity feed of bulk material from the lower container 32a into the fill hopper 30. The different containers 32a and 32b in a given stack 112 may be filled with the same or different types of bulk material for supplying the fill hopper 30 on the silo 12.

In the illustrated embodiment, the upper container 32b may include a chute 116 extending downward and interfacing with an internal volume of the lower container 32a. As a result, bulk material may flow from the upper container 32b into the lower container 32a to replace bulk material that is moving from the lower container 32a into the fill hopper 30. In other embodiments, the upper container 32b may also include a chute (e.g., 116) extending from a lower portion of the upper container 32b down into the fill hopper 30, similar to the chute 114. This may enable bulk material to be supplied selectively from either one of the containers 32a and 32b, or from both containers 32a and 32b at the same time. The chute 116 may be designed to provide a gravity feed of bulk material either from the upper container 32b into the lower container 32a or from the upper container 32a directly into the fill hopper 30.

Other stacked arrangements of containers 32 for supplying the fill hopper 30 may be utilized in other embodiments. For example, in some embodiments, multiple container stacks 112 may be disposed around the fill hopper 30, with chutes 114 and/or 116 extending directly into the fill hopper 30. The container stacks 112 may include two containers 32, as shown, or may include any other number of containers 32 (e.g., 1, 3, 4, 5, 6, or more) stacked on top of each other. The containers 32 may be stacked while they are in storage at the well site as well as while they are positioned to supply bulk material to the fill hopper 30.

In some embodiments, when one or more containers 32 in a given stack 112 are emptied, the containers 32 may be individually removed and replaced within the stack 112. In other embodiments, multiple stacked containers 32 may be removed in a single motion and replaced with another stack of containers 32. In either case, the removal/replacement of the containers 32 disposed in one or more stacks 112 around the fill hopper 30 may be accomplished using a hoisting mechanism (e.g., crane or forklift) that is configured to engage the containers 32. The hoisting mechanism may be utilized to bring the one or more containers 32 into a desired elevated position within a container stack 112.

In addition to those described with reference to FIGS. 4-6, other systems and methods may be utilized in other embodiments to provide bulk material directly from one or more containers 32 into the fill hopper 30, which supplies the bucket lift 28 and the silo 12. When filled with bulk material, the silo 12 may increase the dwell time available at the well site while performing a well treating process. That is, the silo 12 may offer storage for a larger quantity of bulk material than would be available if delivering bulk material only from containers directly to a blender. In addition, the increased storage capacity of the silo 12 may give operators more time to maneuver containers 32 at the well site (e.g., operating hoisting machinery, loading/unloading containers on transportation units relative to a conveyor, etc.). Thus, the additional capacity afforded by the silo 12 may reduce or eliminate single point failures in bulk material transfer, by providing extra dwell time for mitigating issues that might occur while moving containers 32 about the well site. For example, if a container 32 holding the wrong type of bulk material is positioned on a conveyor or in a container stack, the container 32 may be removed and replaced without affecting the supply of bulk material from the silo 12 to the blender.

The containers 32 described above with reference to FIGS. 1-6 may be designed to enable relatively easy transportation and release of bulk material into the fill hopper 30. For example, the containers 32 used to fill the fill hopper 30 may be any desirable shape. The containers 32 may be squared, rounded, cylindrical, oblong, oval, slightly bowed, or any other desirable shape. The containers 32 may be a "dump" type of container with one or more hatches at the bottom designed to automatically open in a manner that dumps the bulk material out of the container 32. The "dump" type of containers 32 may also include one or more operable gates on the bottom of the containers 32 designed to be opened/closed to dump the bulk material.

In some embodiments, the containers 32 may include one or more Super Sack® containers. When using these types of containers 32, the automatic dumping may be achieved by moving the sack across a sharp blade. Once the bulk material is transferred therefrom, the empty sacks may be removed and deposited in a trash bin. In other embodiments, the containers 32 may include one or more reusable sacks with a relatively stronger construction that enables the sacks to be refilled off location. That way, the sacks can later be returned to and re-used as containers 32 to supply bulk material to the fill hopper 30. These reusable sacks may be constructed as larger than existing Super Sacks and designed so they can be filled from the top and emptied out of the bottom.

In some embodiments, the containers 32 may be partially or fully enclosed to guard the bulk material against the elements (e.g., sun, rain, and other weather). The containers 32 may be equipped with additional side walls disposed around the internal volume of the containers 32, for aesthetic reasons as well as to enable easier cleanup after the container 32 is emptied into the fill hopper 30. That is, any dust generated from within the internal volume of the container 32 may be contained within the additional side walls and enclosed portions and then subsequently removed or filtered, to prevent undesirable dust accumulation outside the container 32. In some embodiments, the containers 32 may be constructed with one or more coupling mechanisms (e.g., hooks, latches, slots) to enable engagement between the container 32 and a hoisting mechanism (e.g., crane, forklift, etc.) used to raise or lower the container 32.

In some embodiments, each container 32 when filled to maximum capacity may hold approximately one tank truck worth of bulk material. To accommodate this amount of bulk material, each of the containers 32 may have an internal volume of up to approximately 14 cubic meters for holding bulk material. In other embodiments, however, the containers 32 may hold a smaller or larger amount of bulk material than a tank truck. The silo 12 may have a capacity to hold up to approximately 7 or 8 containers 32 worth of bulk material. However, other embodiments of the silo 12 may have a smaller capacity or a larger capacity (particularly for those with two internal compartments 52 and 54).

Each of the containers 32 used to supply bulk material to the silo 12 may be designed to provide a gravity feed of bulk material into the fill hopper 30. That is, the bulk material is moved from the containers 32 into the fill hopper 30 via gravity, instead of on a conveyor. This may keep the bulk material from generating a large amount of dust, since the bulk material is flowing into the fill hopper 30 instead of falling into the hopper (which would cause air entrainment of the dust), as the bucket lift 28 moves bulk material from the fill hopper 30 into the silo 12 and more capacity within the fill hopper 30 becomes available.

The containers 32 may utilize a choke-feed mode to meter the bulk material into the fill hopper 30. For example, each container 32 (and/or the chute extending therefrom) may be shaped to provide a choke feed for the bulk material output from the container 32 to the fill hopper 30. Once a pile of bulk material is established within the fill hopper 30, this pile may regulate the amount of bulk material that can be directed from the container 32 into the fill hopper 30. This may be the case for containers 32 used to supply bulk material to the fill hopper 30 individually as well as for containers 32 positioned in stacks (e.g., 112 of FIG. 6).

In some embodiments, when the container 32 is brought to a position proximate the fill hopper 30, a portion of the container 32 (e.g., chute) may extend directly into the fill hopper 30. That way, additional bulk material is discharged from the container 32 at a fill level of the bulk material already present in the fill hopper 30. When an outlet valve or dumping mechanism on the container 32 is actuated, a bottom portion of the container 32 (or top portion of the chute) may be opened and kept open while the container 32 fills the fill hopper 30. The bulk material may travel down and be discharged into the fill hopper 30 under a force due to gravity working on the bulk material. In embodiments where solid bulk material is used, an angle of repose of the bulk material in the fill hopper 30 may affect the flow rate of material from the container 32.

Bulk material inventory tracking may be generally desired at the well site. As shown in FIGS. 3, 4, and 6, such bulk material inventory tracking may be accomplished through a number of different sensors 130 disposed about the well site. These sensors 130 may be communicatively coupled to one or more controllers 132 (e.g., automated control system), which utilize at least a processor component 134 and a memory component 136 to monitor and/or control inventory at the well site. For example, one or more processor components 134 may be designed to execute instructions encoded into the one or more memory components 136. Upon executing these instructions, the processors 134 may provide passive logging of the amount, type, and location of certain bulk materials at the well site. In some embodiments, the one or more processors 134 may execute instructions for controlling the amount, type, and location of bulk materials that are being transported about the well site. For example, the processors 134 may output signals at a user interface 138 for instructing operators to remove an empty container 32 from a position near the fill hopper 30 and replace the container 32 with a new container 32 holding a certain type of bulk material needed for the well treatment. Other types of instructions for inventory control/monitoring may be provided through the disclosed systems, such as controlling gates 58 and 60 of the silo 12.

As noted above, the inventory control system 132 may include a number of different sensors 130. In some embodiments, these sensors 130 may include one or more load cells or bin full switches for tracking a level of bulk material in a container 32 and indicating whether a container 32 is empty, near empty, full, or partially full. Such sensors 130 may be used for any given container 32, the fill hopper 30, the inclined lift hopper 66, the silo 12, or any other component at the well site. In addition, in some embodiments the sensors 130 may include RFID tags used to provide an indication of the particle size, bulk volume, weight, type, material, and/or supplier of the bulk material disposed in a certain container 32. In such instances, the controller 132 may be communicatively coupled to an RFID reader disposed in proximity to the containers 32 being moved about the well site.

In some embodiments, the containers 32 may include one or more electronic sensors 130 used to determine and indicate whether the container 32 is full or empty. As noted above, such electronic sensors 130 may be communicatively coupled (e.g., wirelessly) to the automated control system 132. The sensors 130 may instruct the system 10 or operators to proceed to the next available container when an "empty" or "nearly empty" signal is detected. In other embodiments, the containers 32 may be equipped with a mechanical sensor or mechanical indicator for indicating whether the container 32 is full or empty. The automated control system 132 may also utilize signals from load cells or other sensors 130 on the silo 12 to double check the amount of bulk material contents in storage and to ensure that the bulk material is metered correctly to/from the silo 12.

By using the containers 32 with the bucket conveyor system 27 to fill the silo 12, the disclosed systems and methods may reduce an amount of dust generation, noise, and detention costs associated with filling the silo 12, as compared to pneumatic filling processes. As described above, the disclosed system utilizes several relatively small, independent containers 32 along with a bucket lift 28 to supply bulk material into the silo 12, instead of pneumatically filling the silo 12. This arrangement of individual containers 32 may provide relatively easy methods for transporting the bulk material around the well site and to/from the silo 12. For example, the containers 32 may enable quick unloading of a transportation unit and quick transfer of bulk material from the containers 32 to the silo 12 using any of the above described methods (e.g., conveyor, elevated container stacks, secondary compartment filling, etc.). This type of unloading/loading via the containers 32 may be accomplished more efficiently than a pneumatic loading process for filling the silo 12. In addition, the containers 32 may be quickly pushed out of the way and removed from the position proximate the fill hopper 30 once emptied. The smaller volumes of bulk material provided in the containers 32 may enable a relatively rapid change of the type of bulk material delivered to the fill hopper 30. The multiple containers 32 (and/or the secondary compartment 54) used to supply the fill hopper 30 may provide a buffer for bulk material delivery so that the bucket lift 28 and silo 12 are constantly being supplied with bulk material while transportation units are arriving and being unloaded at the well site. Furthermore, once the treatments are completed at the well site, any remainder of filled containers 32 may be easily hauled off or otherwise removed from location.

By making the bulk material unloading/loading process on location more efficient, the disclosed techniques may reduce the detention costs accrued at the well site, since transportation units may be able to unload their materials faster than would be possible using pneumatics. In addition, the disclosed techniques may enable the transfer of bulk material on location without generating excessive noise that would otherwise be produced through a pneumatic loading process. Still further, the bulk material remains in the individual containers 32 until it is output directly into the fill hopper 30 of the silo 12 for metering to a well treatment. Since the bulk material remains in the containers 32, instead of being released onto a conveyor, the containers 32, along with the bucket conveyor system 27 on the silo 12, may enable movement of bulk material on location without generating a large amount of dust.

Although the disclosure and its advantages have been described in detail, it should be understood that various changes, substitutions and alterations can be made herein without departing from the spirit and scope of the disclosure as defined by the following claims.

What is claimed is:

1. A method, comprising:
    delivering a container holding bulk material to a fill hopper disposed proximate a silo;
    releasing the bulk material from the container directly into the fill hopper;
    transferring the bulk material from the fill hopper into a storage compartment within the silo via a bucket lift disposed on the silo and coupled to the fill hopper;
    discharging the bulk material from the storage compartment of the silo via a chute extending into a blender receptacle associated with a blender; and
    routing bulk material from a secondary storage compartment of the silo into the fill hopper.

2. The method of claim 1, wherein delivering the container to the fill hopper comprises moving the container along a conveyor between a transportation unit and the fill hopper.

3. The method of claim 1, wherein delivering the container to the fill hopper comprises moving two or more containers holding different types of bulk material to the fill hopper along separate tracks.

4. The method of claim 1, wherein delivering the container to the fill hopper comprises disposing the container in an elevated stack with a chute extending from the container directly into the fill hopper.

5. The method of claim 1, further comprising selectively opening a gate disposed between the storage compartment and the secondary storage compartment to route a portion of the bulk material from the storage compartment to the secondary storage compartment.

6. The method of claim 1, further comprising filling the secondary storage compartment via a separate lift mechanism.

7. The method of claim 1, further comprising filling the secondary compartment via an overflow port extending into the primary compartment.

8. The method of claim 1, wherein the blender receptacle comprises a mixing compartment of the blender where the bulk material is mixed with additives to generate a downhole fluid.

9. The method of claim 1, wherein the blender receptacle comprises a hopper disposed on the blender for routing the bulk material to a mixing compartment.

10. A system, comprising:
    a silo comprising an upper storage compartment and a lower storage compartment;
    a discharge chute extending from the upper storage compartment of the silo;
    a fill hopper for receiving bulk material directly from a container disposed proximate the fill hopper;

a bucket lift disposed on the silo and coupled between the fill hopper and the upper storage compartment for lifting the bulk material from the fill hopper into the upper storage compartment; and a gate disposed between the lower storage compartment and the fill hopper for selectively providing a portion of bulk material from the lower storage compartment to the fill hopper.

11. The system of claim 10, further comprising a second gate between the upper and lower storage compartments for emptying a portion of the bulk material from the upper storage compartment to the lower storage compartment.

12. The system of claim 10, further comprising an overflow port extending into the upper storage compartment for emptying a portion of the bulk material from the upper storage compartment to the lower storage compartment.

13. The system of claim 10, further comprising a separate lift for filling the lower storage compartment with bulk material.

14. The system of claim 10, wherein the gate is disposed in an open position to provide a gravity feed of bulk material from the lower storage compartment to the fill hopper when the container is removed from a position proximate the fill hopper.

15. A system, comprising:
a silo comprising a storage compartment;
a discharge chute extending from the storage compartment of the silo;
a fill hopper disposed proximate the silo;
a bucket lift disposed on the silo and coupled between the fill hopper and the storage compartment for lifting bulk material from the fill hopper into the storage compartment;
a first container holding bulk material, wherein the first container is disposed proximate the fill hopper for outputting bulk material from the first container directly into the fill hopper; and
a second container holding bulk material, wherein the first and second containers are disposed in a stack proximate the fill hopper.

16. The system of claim 15, further comprising a conveyor for directing the first container from a transportation unit to a position directly above the fill hopper.

17. The system of claim 15, further comprising a second container holding bulk material, wherein the first and second containers each comprise respective chutes that are extending from the first and second containers into the fill hopper.

18. The system of claim 15, wherein the first container is shaped to provide a choke feed of the bulk material from the first container into the fill hopper.

* * * * *